J. G. HODGSON.
DEMOUNTABLE RESILIENT TIRE SEATING RIM FOR AUTOMOBILE WHEELS.
APPLICATION FILED APR. 17, 1911.
1,194,020. Patented Aug. 8, 1916.
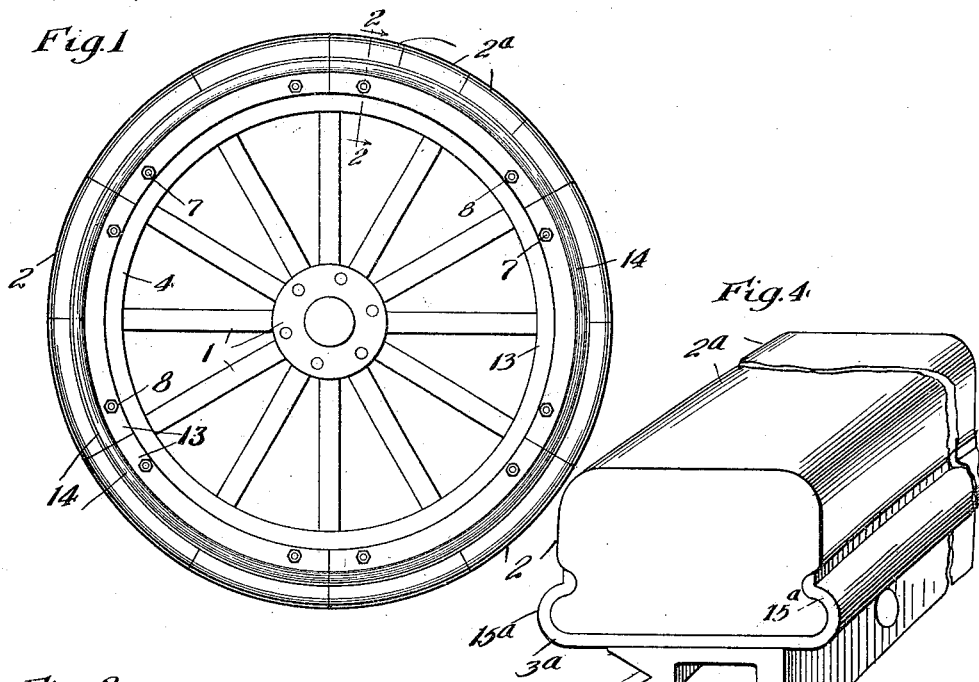
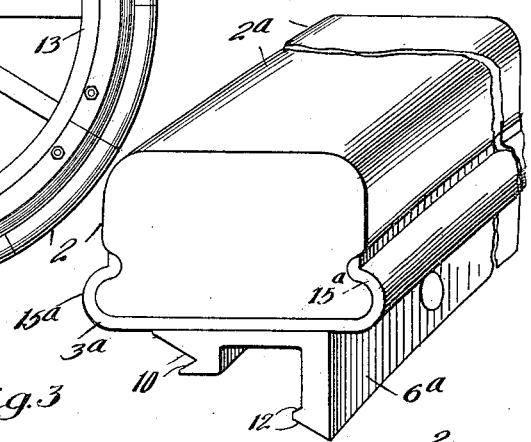
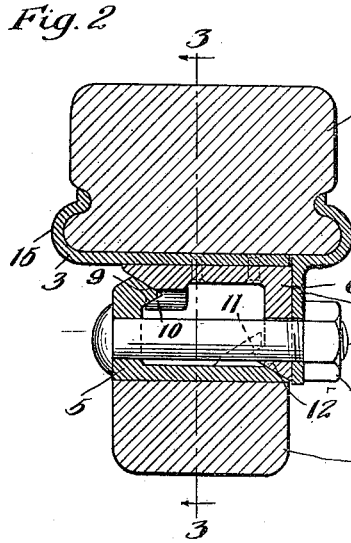
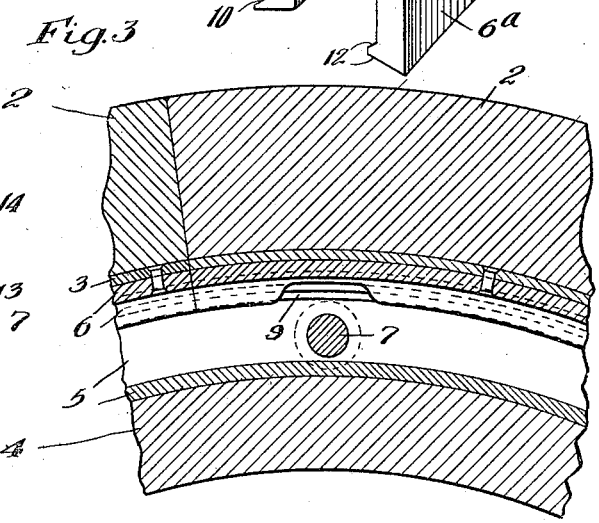
Witnesses:
Wm. Geiger
Pearl Abrams
Inventor
John G. Hodgson
By Munday, Evarts, Adcock & Clarke
his Attys.

UNITED STATES PATENT OFFICE.

JOHN G. HODGSON, OF MAYWOOD, ILLINOIS.

DEMOUNTABLE RESILIENT TIRE-SEATING RIM FOR AUTOMOBILE-WHEELS.

1,194,020.  Specification of Letters Patent.  Patented Aug. 8, 1916.

Application filed April 17, 1911. Serial No. 621,494.

*To all whom it may concern:*

Be it known that I, JOHN G. HODGSON, a citizen of the United States, residing in Maywood, in the county of Cook and State of Illinois, have invented a new and useful Improvement in Demountable Resilient Tire-Seating Rims for Automobile-Wheels, of which the following is a specification.

My invention relates to improvements in demountable tire seating rims for motor car or other vehicle wheels.

The object of my invention is to provide a demountable tire seating rim for resilient tires of motor car or other vehicle wheels which will be especially adapted for use in connection with solid rubber tires and will enable a worn or injured section of any length of such tire to be readily replaced by a new section without disturbing the remaining portion of the tire.

My invention consists in the novel construction of parts and devices and in the novel combinations of parts and devices herein shown and described by which this object or result is practically accomplished, the same being more particularly specified in the claim.

In the accompanying drawing forming a part of this specification, Figure 1 is a side elevation of a resilient tired motor car wheel embodying my invention. Fig. 2 is an enlarged detail cross section on line 2—2 of Fig. 1. Fig. 3 is a partial vertical section in the plane of the wheel on line 3—3 of Fig. 2, and Fig. 4 is a detail perspective view showing a modification.

In the drawing, 1 represents a motor car or other vehicle wheel, 2 its resilient tire, preferably of solid rubber, 3 the tire seating rim, 4 the felly, 5 a metal band shrunk upon the felly, 6 a coöperating metal ring secured to the metal band 5 by clamp bolts 7 having threaded nuts 8, the metal band 5 and removable ring 6 being preferably furnished with oppositely disposed double cone wedge faces 9, 10, 11, 12.

The rubber or other resilient tire 2 is held in place on the tire seating rim 3 by a sectional clamp ring or member 13, preferably made in six different segments or sections and secured to the removable ring 6 by the clamp bolts 7, two clamp bolts passing through each segment or section of the segmental clamp member. The sectional clamp member 13 is furnished with curved flange 14 corresponding to the curved flange 15 of the tire seating rim 3 for engagement with the tire 2.

As the tire clamping member or ring 13 is made in a plurality of sections or segments, each separately removable, a worn or injured segment of the tire 2 may be cut out and removed and replaced by a new segment 2ª very easily and conveniently and without disturbing the main portion of the tire 2. In the drawing in Fig. 1 I have represented the tire 2 as being provided with a number of new or replaced segments 2ª of varying lengths to illustrate the manner in which the tire may be repaired as occasion may require.

In the modification illustrated in Fig. 4, the tire seating rim 3ª is made of the clencher type and sectional or composed of six different sections or segments, each section with its own integral flanges 15ª on both sides for engagement with the tire, and in this construction, the metal ring 6ª is made in a plurality of relatively short segments, preferably about six to make up the circle, and the tire 2ª is also made in a plurality of separate sections or segments of corresponding length to the metal ring segments 6ª, so that any one of the sections or segments 6ª of the metal ring with its segment of the tire 2ª and segment of the tire seating rim 3ª may be removed and replaced as required.

The metal ring 6 and the tire seating rim 3, as shown in Figs. 1, 2 and 3 may preferably be sectional or composed of six or more separate piece segments, as illustrated in the drawing. It will be apparent, however, that many changes may be made other than those shown on the drawing which will readily occur to those skilled in the art and all such changes as come within the scope of the appended claim are understood to be contemplated in this description.

I claim:—

In a demountable vehicle wheel rim, the combination of a continuous metal band shrunk upon the felly of a wheel and being higher at one side than at the other, a sectional band adapted to engage both sides of the first mentioned band, said band having coöperating wedge faces, holding bolts extending horizontally through said bands, sectional tire holding flanges and a sectional tire held thereby, a tire section, its holding flanges and a corresponding section of said sectional band being removable upon release of appropriate clamping bolts to permit replacement of the tire sections without disturbing other tire sections.

JOHN G. HODGSON.

Witnesses:
 EDMUND ADCOCK,
 PEARL ABRAMS.